US011122627B2

United States Patent
Lee et al.

(10) Patent No.: US 11,122,627 B2
(45) Date of Patent: Sep. 14, 2021

(54) METHOD OF RANDOM ACCESS PROCEDURE IN WIRELESS COMMUNICATION SYSTEM AND APPARATUS THEREFOR

(71) Applicant: LG Electronics Inc., Seoul (KR)

(72) Inventors: Sunyoung Lee, Seoul (KR); Jayeong Kim, Seoul (KR); Jeonggu Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/459,146

(22) Filed: Jul. 1, 2019

(65) Prior Publication Data

US 2020/0008242 A1   Jan. 2, 2020

(30) Foreign Application Priority Data

Jun. 29, 2018   (KR) .................. 10-2018-0076048

(51) Int. Cl.
| | | |
|---|---|---|
| *H04W 74/08* | (2009.01) | |
| *H04W 36/30* | (2009.01) | |
| *H04W 36/06* | (2009.01) | |
| *H04W 74/00* | (2009.01) | |

(52) U.S. Cl.
CPC ....... *H04W 74/0833* (2013.01); *H04W 36/06* (2013.01); *H04W 36/305* (2018.08); *H04W 74/004* (2013.01)

(58) Field of Classification Search
CPC ........... H04W 74/0833; H04W 74/004; H04W 36/305; H04W 36/06; H04W 52/146
See application file for complete search history.

(56) References Cited

U.S. PATENT DOCUMENTS

| | | | | |
|---|---|---|---|---|
| 2012/0076042 | A1* | 3/2012 | Chun ................. | H04W 72/042 370/252 |
| 2019/0313469 | A1* | 10/2019 | Karampatsis ......... | H04W 36/04 |
| 2020/0084709 | A1* | 3/2020 | Niu ...................... | H04B 17/318 |

OTHER PUBLICATIONS

Ericsson: "Switch between SUL and NUL during ongoing RA procedure", R2-1810067, 3GPP TSG RAN WG2 AH 1807, Montreal, Canada, Jul. 2-6, 2018.

* cited by examiner

*Primary Examiner* — Wei Zhao
(74) *Attorney, Agent, or Firm* — Dentons US LLP

(57) ABSTRACT

A method for performing a random access (RA) procedure by a user equipment (UE) in a wireless communication system is provided. The method comprises: selecting an uplink carrier for the RA procedure between a first uplink carrier for a serving cell and a second uplink carrier for the serving cell; and performing a first random access preamble (RAP) transmission for the RA procedure through the selected uplink carrier. Selecting the uplink carrier comprises: selecting the first uplink carrier when a downlink signal quality of the serving cell is less than a first threshold, and selecting one of the first and second uplink carriers randomly when the downlink signal quality of the serving cell is equal to or above the first threshold.

11 Claims, 7 Drawing Sheets

(a) User Plane Protocol Stack (b) Control Plane Protocol Stack

METHOD OF RANDOM ACCESS PROCEDURE IN WIRELESS COMMUNICATION SYSTEM AND APPARATUS THEREFOR

CROSS-REFERENCE TO RELATED APPLICATIONS

The present application claims the benefit of an earlier filing date and right of priority to Korean Provisional Application No. 10-2018-0076048, filed on Jun. 29, 2018, the contents of which are hereby incorporated by reference.

TECHNICAL FIELD

The present disclosure generally relates to a wireless communication system.

BACKGROUND

In a wireless communication system, a user equipment (UE) typically transmits signals to a base station (BS) via an uplink (UL), and the UE receives signals from the BS via a downlink (DL). Various types of signals, including data signals and control signals, are communicated via the UL and DL. Scheduling of such communications is typically performed, to achieve improved efficiency, latency, and/or reliability.

SUMMARY

An aspect of the present disclosure includes a method of transmitting an uplink (UL) signal by a user equipment (UE) in a wireless communication system. The method comprises: selecting a uplink carrier for the RA procedure between a first uplink carrier for a serving cell and a second uplink carrier for the serving cell; and performing a first random access preamble (RAP) transmission for the RA procedure through the selected uplink carrier. In the method, selecting the uplink carrier comprises: selecting the first uplink carrier when a downlink signal quality of the serving cell is less than a first threshold, and selecting one of the first and second uplink carriers randomly when the downlink signal quality of the serving cell is equal to or above the first threshold. Other embodiments of this aspect include corresponding computer systems, apparatus, and computer programs recorded on one or more computer storage devices, each configured to perform the actions of the methods.

Another aspect of the present disclosure includes a user equipment (UE) for performing a random access (RA) procedure in a wireless communication system. The UE comprises: a transceiver; at least one processor; and at least one computer memory operably connectable to the at least one processor and storing instructions that, when executed, cause the at least one processor to perform operations. The operations comprises: selecting a uplink carrier for the RA procedure between a first uplink carrier for a serving cell and a second uplink carrier for the serving cell; and performing a first random access preamble (RAP) transmission for the RA procedure through the selected uplink carrier. The operation of selecting the uplink carrier comprises: selecting the first uplink carrier when a downlink signal quality of the serving cell is less than a first threshold, and selecting one of the first and second uplink carriers randomly when the downlink signal quality of the serving cell is equal to or above the first threshold.

In each aspect of the present disclosure, the method or operations may further comprise: reselecting an uplink carrier for the RA procedure when a random access response (RAR) reception for the first RAP transmission or contention resolution for the first RAP transmission fails and when the downlink signal quality of the serving cell is in a range of a second threshold to a third threshold; and performing a second RAP transmission through the reselected uplink carrier.

In each aspect of the present disclosure, the second threshold may be equal to the first threshold minus X, and the third threshold is equal to the first threshold plus Y, where X and Y are positive values, respectively.

In each aspect of the present disclosure, X and Y are configured by a network.

In each aspect of the present disclosure, the method or operations may further comprise: reselecting an uplink carrier for the RA procedure when a random access response (RAR) reception for the first RAP transmission or contention resolution for the first RAP transmission fails and when current downlink signal quality of the serving cell is changed more than X compared to the downlink signal quality of the serving cell; and performing a second RAP transmission through the reselected uplink carrier.

In each aspect of the present disclosure, the first uplink carrier may be operating at a lower frequency than that of the second uplink carrier.

In each aspect of the present disclosure, the method or operations may further comprise: receiving configuration information regarding the first threshold.

In each aspect of the present disclosure, the UE performing the method or operations may be an autonomous vehicle that communicates with at least a mobile terminal, a network, and another autonomous vehicle other than the UE.

BRIEF DESCRIPTION OF THE DRAWINGS

The accompanying drawings, which are included to provide a further understanding of the invention, illustrate embodiments of the invention and together with the description serve to explain the principle of the invention.

DETAILED DESCRIPTION

Reference will now be made in detail to the exemplary implementations of the present disclosure, examples of which are illustrated in the accompanying drawings. The detailed description, which will be given below with reference to the accompanying drawings, is intended to explain exemplary implementations of the present disclosure, rather than to show the only implementations that can be implemented according to the disclosure. The following detailed description includes specific details in order to provide a thorough understanding of the present disclosure. However, it will be apparent to those skilled in the art that the present disclosure may be practiced without such specific details.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, implementations of the present disclosure are described in regards to a 3GPP based wireless communication system. However, the technical features of the present disclosure are not limited thereto. For example, although the following detailed description is given based on a mobile communication system corresponding to a 3GPP based system, aspects of the present disclosure that are not limited to 3GPP based system are applicable to other mobile communication systems.

For example, the present disclosure is applicable to contention based communication such as Wi-Fi as well as non-contention based communication as in the 3GPP based system in which a BS allocates a DL/UL time/frequency resource to a UE and the UE receives a DL signal and transmits a UL signal according to resource allocation of the BS. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

For terms and technologies which are not specifically described among the terms of and technologies employed in the present disclosure, the wireless communication standard documents published before the present disclosure may be referenced. For example, the following documents may be referenced.

3GPP LTE
- 3GPP TS 36.211: Physical channels and modulation
- 3GPP TS 36.212: Multiplexing and channel coding
- 3GPP TS 36.213: Physical layer procedures
- 3GPP TS 36.214: Physical layer; Measurements
- 3GPP TS 36.300: Overall description
- 3GPP TS 36.304: User Equipment (UE) procedures in idle mode
- 3GPP TS 36.314: Layer 2—Measurements
- 3GPP TS 36.321: Medium Access Control (MAC) protocol
- 3GPP TS 36.322: Radio Link Control (RLC) protocol
- 3GPP TS 36.323: Packet Data Convergence Protocol (PDCP)
- 3GPP TS 36.331: Radio Resource Control (RRC) protocol 3GPP NR (e.g. 5G)
- 3GPP TS 38.211: Physical channels and modulation
- 3GPP TS 38.212: Multiplexing and channel coding
- 3GPP TS 38.213: Physical layer procedures for control
- 3GPP TS 38.214: Physical layer procedures for data
- 3GPP TS 38.215: Physical layer measurements
- 3GPP TS 38.300: Overall description
- 3GPP TS 38.304: User Equipment (UE) procedures in idle mode and in RRC inactive state
- 3GPP TS 38.321: Medium Access Control (MAC) protocol 3GPP TS 38.322: Radio Link Control (RLC) protocol
3GPP TS 38.323: Packet Data Convergence Protocol (PDCP)
3GPP TS 38.331: Radio Resource Control (RRC) protocol
3GPP TS 37.324: Service Data Adaptation Protocol (SDAP)
3GPP TS 37.340: Multi-connectivity; Overall description In the present disclosure, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present disclosure, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Especially, a BS of the UMTS is referred to as a NB, a BS of the EPC/LTE is referred to as an eNB, and a BS of the new radio (NR) system is referred to as a gNB.

In the present disclosure, a node refers to a fixed point capable of transmitting/receiving a radio signal through communication with a UE. Various types of BSs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be a BS. For example, the node may be a radio remote head (RRH) or a radio remote unit (RRU). The RRH or RRU generally has a lower power level than a power level of a BS. Since the RRH or RRU (hereinafter, RRH/RRU) is generally connected to the BS through a dedicated line such as an optical cable, cooperative communication between RRH/RRU and the BS can be smoothly performed in comparison with cooperative communication between BSs connected by a radio line. At least one antenna is installed per node. The antenna may include a physical antenna or an antenna port or a virtual antenna.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and an uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In carrier aggregation (CA), two or more CCs are aggregated. A UE may simultaneously receive or transmit on one or multiple CCs depending on its capabilities. CA is supported for both contiguous and non-contiguous CCs. When CA is configured the UE only has one radio resource control (RRC) connection with the network. At RRC connection establishment/re-establishment/handover, one serving cell provides the non-access stratum (NAS) mobility information, and at RRC connection re-establishment/handover, one serving cell provides the security input. This cell is referred to as the Primary Cell (PCell). The PCell is a cell, operating on the primary frequency, in which the UE either performs the initial connection establishment procedure or initiates the connection re-establishment procedure. Depending on UE capabilities, Secondary Cells (SCells) can be configured to form together with the PCell a set of serving cells. An SCell is a cell providing additional radio resources on top of Special Cell. The configured set of serving cells for a UE therefore always consists of one PCell and one or more SCells. For dual connectivity operation, the term Special Cell (SpCell) refers to the PCell of the master cell group (MCG) or the PSCell of the secondary cell group (SCG). An SpCell supports PUCCH transmission and contention-based random access, and is always activated. The MCG is a group of serving cells associated with a master node, comprising of the SpCell (PCell) and optionally one or more SCells. The SCG is the subset of serving cells associated with a secondary node, comprising of the PSCell and zero or more SCells, for a UE configured with dual connectivity (DC). For a UE in RRC_CONNECTED not configured with CA/DC there is only one serving cell comprising of the PCell. For a UE in RRC_CONNECTED configured with CA/DC the term "serving cells" is used to denote the set of cells comprising of the SpCell(s) and all SCells. In DC, two MAC entities are configured in a UE: one for the MCG and one for the SCG.

In the present disclosure, "PDCCH" may refer to a PDCCH, an EPDCCH (in subframes when configured), a MTC PDCCH (MPDCCH), for an RN with R-PDCCH configured and not suspended, to the R-PDCCH or, for NB-IoT to the narrowband PDCCH (NPDCCH).

In the present disclosure, monitoring a channel refers to attempting to decode the channel. For example, monitoring a PDCCH refers to attempting to decode PDCCH(s) (or PDCCH candidates).

In the present disclosure, for dual connectivity (DC) operation, the term "special Cell" refers to the PCell of the master cell group (MCG) or the PSCell of the secondary cell group (SCG), and otherwise the term Special Cell refers to the PCell. The MCG is a group of serving cells associated with a master BS which terminates at least S1-MME, and the SCG is a group of serving cells associated with a secondary BS that is providing additional radio resources for the UE but is not the master BS. The SCG includes a primary SCell (PSCell) and optionally one or more SCells. In dual connectivity, two MAC entities are configured in the UE: one for the MCG and one for the SCG. Each MAC entity is configured by RRC with a serving cell supporting PUCCH transmission and contention based Random Access. In this specification, the term SpCell refers to such cell, whereas the term SCell refers to other serving cells. The term SpCell either refers to the PCell of the MCG or the PSCell of the SCG depending on if the MAC entity is associated to the MCG or the SCG, respectively.

In the present disclosure, "C-RNTI" refers to a cell RNTI, "SI-RNTI" refers to a system information RNTI, "P-RNTI" refers to a paging RNTI, "RA-RNTI" refers to a random access RNTI, "SC-RNTI" refers to a single cell RNTI", "SL-RNTI" refers to a sidelink RNTI, "SPS C-RNTI" refers to a semi-persistent scheduling C-RNTI, and "CS-RNTI" refers to a configured scheduling RNTI.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential IoT devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g. e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Figure 1:
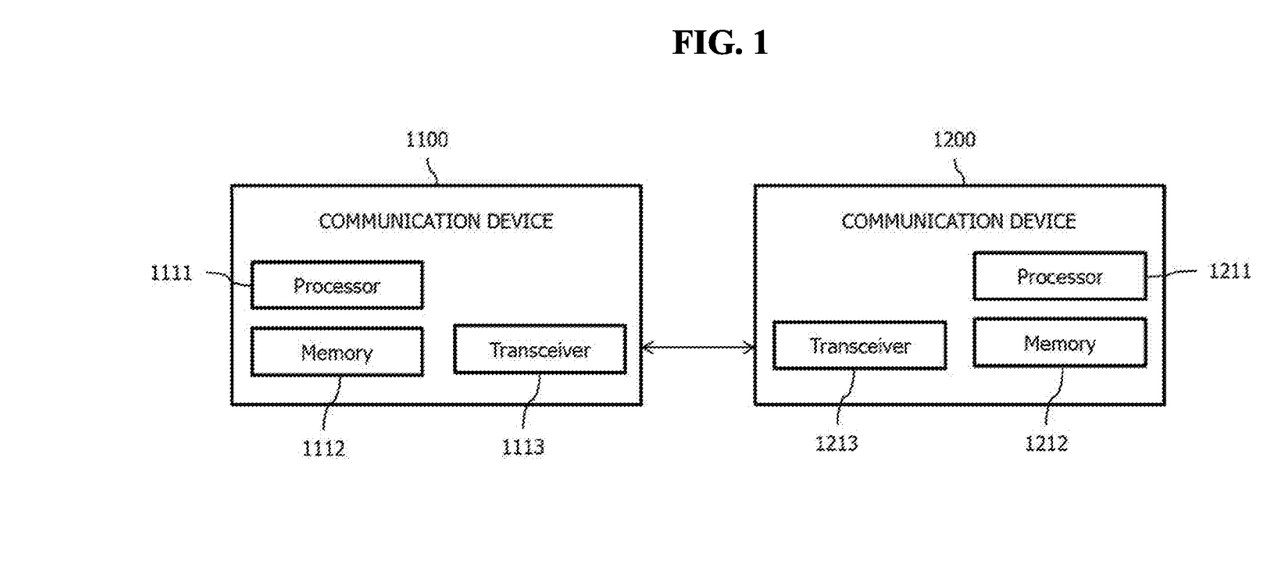
FIG. 1 is a block diagram illustrating examples of communication devices which can perform a method according to the present disclosure.

FIG. 1 is a block diagram illustrating examples of communication devices which can perform a method according to the present disclosure.

In the present disclosure, a user equipment (UE) may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a wearable device (e.g., a smartwatch, a smartglass, or head mounted display (HMD)), and the like. The HMD may be, for example, a type of display device that is worn on the head. For example, the HMD may be used to implement virtual reality (VR), augmented reality (AR), or mixed reality (MR).

In the present disclosure, an unmanned aerial vehicle (UAV) may be, for example, an aircraft without a human being onboard, which aviates by a wireless control signal. In the present disclosure, a VR device may include, for example, a device for implementing an object or a background of the virtual world. The AR device may include, for example, a device implemented by connecting an object or a background of the virtual world to an object or a background of the real world. In the present disclosure, a MR device may include, for example, a device implemented by merging an object or a background of the virtual world into an object or a background of the real world. In the present disclosure, a hologram device may include, for example, a device for implementing a stereoscopic image of 360 degrees by recording and reproducing stereoscopic information, using an interference phenomenon of light generated when two laser lights called holography meet. The public safety device may include, for example, an image relay device or an image device that is wearable on the body of a user. In the present disclosure, a MTC device and a IoT device may be, for example, devices that do not require direct human intervention or manipulation. For example, the MTC device and the IoT device may include smartmeters, vending machines, thermometers, smartbulbs, door locks, or various sensors. In the present disclosure, a medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure. In the present disclosure, a security device may be, for example, a device installed to prevent a danger that may arise and to maintain safety. For example, the security device may be a camera, a CCTV, a recorder, or a black box. In the present disclosure, a FinTech device may be, for example, a device capable of providing a financial service such as mobile payment. For example, the FinTech device may include a payment device or a point of sales (POS) system. The weather/environment device may include, for example, a device for monitoring or predicting a weather/environment.

In FIG. 1, each of the communication devices 1100, 1200 may be a base station (BS), a network node, a transmission user equipment (UE), a reception UE, a wireless device, a wireless communication device, a vehicle, a vehicle having an autonomous traveling function, a connected car, an unmanned aerial vehicle (UAV), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or a financial device), a security device, a weather/environment device, a device related to a 5G service, or a device related to a fourth industrial revolution field.

In FIG. 1, one of the communication device 1100 and the communication device 1200 may be a user equipment (UE) and the other one may be a base station (BS). Alternatively, one of the communication device 1100 and the communication device 1200 may be a UE and the other one may be another UE. Alternatively, one of the communication device 1100 and the communication device 1200 may be a network node and the other one may be another network node. In the present disclosure, the network node may be a base station (BS). In some scenarios, the network node may be a core network device (e.g. a network device with a mobility management function, a network device with a session management function, and etc.).

In some scenarios of the present disclosure, either one of the communication devices 1100, 1200, or each of the communication devices 1100, 1200 may be wireless communication device(s) configured to transmit/receive radio signals to/from an external device, or equipped with a wireless communication module to transmit/receive radio signals to/from an external device. The wireless communication module may be a transceiver 1113 or 1213. The wireless communication device is not limited to a UE or a BS, and the wireless communication device may be any suitable mobile computing device that is configured to implement one or more implementations of the present disclosure, such as a vehicular communication system or device, a wearable device, a laptop, a smartphone, and so on. A communication device which is mentioned as a UE or BS in the present disclosure may be replaced by any wireless communication device such as a vehicular communication system or device, a wearable device, a laptop, a smartphone, and so on.

In the present disclosure, communication devices 1100, 1200 include processors 1111, 1211 and memories 1112, 1212. The communication devices 1100 may further include transceivers 1113, 1213 or configured to be operatively connected to transceivers 1113, 1213.

The processor 1111, 1211 implements functions, procedures, and/or methods disclosed in the present disclosure. One or more protocols may be implemented by the processor 1111, 1211. For example, the processor 1111, 1211 may implement one or more layers (e.g., functional layers such as PHY, MAC, RLC, PDCP, RRC, SDAP). The processor 1111, 1211 may generate protocol data units (PDUs) and/or service data units (SDUs) according to functions, procedures, and/or methods disclosed in the present disclosure. The processor 1111, 1211 may generate messages or information according to functions, procedures, and/or methods disclosed in the present disclosure. The processor 1111, 1211 may generate signals (e.g. baseband signals) containing PDUs, SDUs, messages or information according to functions, procedures, and/or methods disclosed in the present disclosure and provide the signals to the transceiver 1113 and/or 1213 connected thereto. The processor 1111, 1211 may receive signals (e.g. baseband signals) from the transceiver 1113, 1213 connected thereto and obtain PDUs, SDUs, messages or information according to functions, procedures, and/or methods disclosed in the present disclosure.

The processor 1111, 1211 may be referred to as controller, microcontroller, microprocessor, or microcomputer. The processor 1111, 1211 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processor 1111, 1211. The present disclosure may be implemented using firmware or software, and the firmware or software may be configured to include modules, procedures, functions, etc. performing the functions or operations of the present disclosure. Firmware or software configured to perform the present disclosure may be included in the processor 1111, 1211 or stored in the memory 1112, 1212 so as to be driven by the processor 1111, 1211.

The memory 1112, 1212 is connected to the processor of the network node and stores various types of PDUs, SDUs, messages, information and/or instructions. The memory 1112, 1212 may be arranged inside or outside the processor 1111, 1211, or may be connected to the processor 1111, 1211 through various techniques, such as wired or wireless connections.

The transceiver 1113, 1213 is connected to the processor 1111, 1211, and may be controlled by the processor 1111, 1211 to transmit and/or receive a signal to/from an external device. The processor 1111, 1211 may control the transceiver 1113, 1213 to initiate communication and to transmit or receive signals including various types of information or data which are transmitted or received through a wired interface or wireless interface. The transceiver 1113, 1213 includes a receiver to receive signals from an external device and transmit signals to an external device. The transceiver 1113, 1213 can up-convert OFDM baseband signals to a carrier frequency under the control of the processor 1111, 1211 and transmit the up-converted OFDM signals at the carrier frequency. The transceiver 1113, 1213 can include an (analog) oscillator, and up-convert the OFDM baseband signals to a carrier frequency by the oscillator. The transceiver 1113, 1213 may receive OFDM signals at a carrier frequency and down-convert the OFDM signals into OFDM baseband signals, under the control of the transceiver 1111, 1211. The transceiver 1113, 1213 may down-convert the OFDM signals with the carrier frequency into the OFDM baseband signals by the oscillator.

In a wireless communication device such as a UE or BS, an antenna facilitates the transmission and reception of radio signals (i.e. wireless signals). In the wireless communication device, the transceiver 1113, 1213 transmits and/or receives a wireless signal such as a radio frequency (RF) signal. For a communication device which is a wireless communication device (e.g. BS or UE), the transceiver 1113, 1213 may be referred to as a radio frequency (RF) unit. In some implementations, the transceiver 1113, 1213 may forward and convert baseband signals provided by the processor 1111, 1211 connected thereto into radio signals with a radio frequency. In the wireless communication device, the transceiver 1113, 1213 may transmit or receive radio signals containing PDUs, SDUs, messages or information according to functions, procedures, and/or methods disclosed in the present disclosure via a radio interface (e.g. time/frequency resources). In some implementations of the present disclosure, upon receiving radio signals with a radio frequency from another communication device, the transceiver 1113, 1213 may forward and convert the radio signals to baseband signals for processing by the processor 1111, 1211. The radio frequency may be referred to as a carrier frequency. In a UE, the processed signals may be processed according to various techniques, such as being transformed into audible or readable information to be output via a speaker of the UE.

In some scenarios of the present disclosure, functions, procedures, and/or methods disclosed in the present disclosure may be implemented by a processing device. The processing device may be a system on chip (SoC). The processing device may include the processor 1111, 1211 and the memory 1112, 1212, and may be mounted on, installed on, or connected to the communication device 1100, 1200. The processing device may be configured to perform or control any one of the methods and/or processes described herein and/or to cause such methods and/or processes to be performed by a communication device which the processing device is mounted on, installed on, or connected to. The memory 1112, 1212 in the processing device may be configured to store software codes including instructions that, when executed by the processor 1111, 1211, causes the processor 1111, 1211 to perform some or all of functions, methods or processes discussed in the present disclosure. The memory 1112, 1212 in the processing device may store or buffer information or data generated by the processor of the processing device or information recovered or obtained by the processor of the processing device. One or more processes involving transmission or reception of the information or data may be performed by the processor 1111, 1211 of the processing device or under control of the processor 1111, 1211 of the processing device. For example, a transceiver 1113, 1213 operably connected or coupled to the processing device may transmit or receive signals containing the information or data under the control of the processor 1111, 1211 of the processing device.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. One of the communication device 1100 and the communication device 1200 may be the UE described or mentioned in the present disclosure. Hereinafter, for convenience of description, it is mainly assumed in the present disclosure that the communication device 1100 acts as the UE, and the communication device 1200 acts as the BS. The processor 1111 connected to, mounted on or launched in the communication device 1100 may be configured to perform the UE behaviour according to an implementation of the present disclosure or control the transceiver 1113 to perform the UE behaviour according to an implementation of the present disclosure. The processor 1211 connected to, mounted on or launched in the communication device 1200 may be configured to perform the BS behaviour according to an implementation of the present disclosure or control the transceiver 1213 to perform the BS behaviour according to an implementation of the present disclosure.

In the present disclosure, a BS is also referred to as a node B (NB), an eNode B (eNB), or a gNB.

Figure 2:
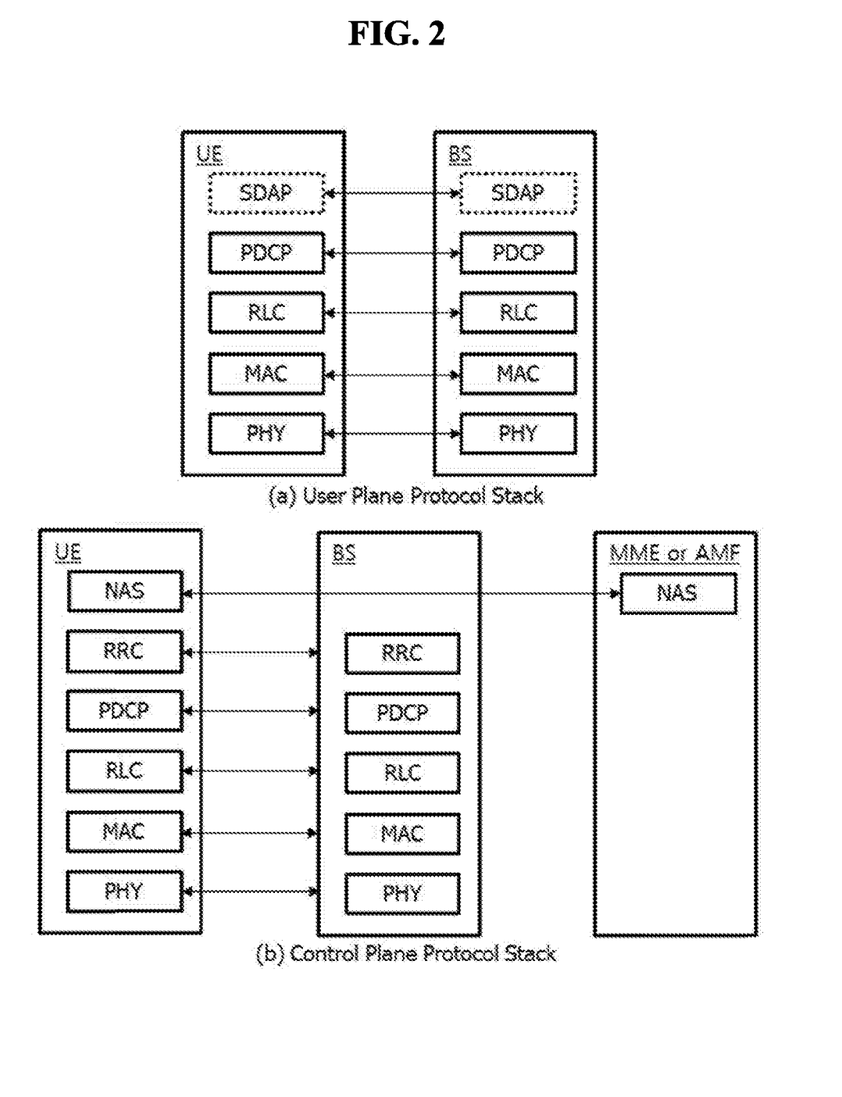
FIG. 2 illustrates an example of protocol stacks in a 3GPP based wireless communication system.

FIG. 2 illustrates an example of protocol stacks in a 3GPP based wireless communication system. In particular, FIG. 2(a) illustrates an example of a radio interface user plane protocol stack between a UE and a base station (BS) and FIG. 2(b) illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 2(a), the user plane protocol stack may be divided into a first layer (Layer 1) (i.e., a physical (PHY) layer) and a second layer (Layer 2). Referring to FIG. 2(b), the control plane protocol stack may be divided into Layer 1 (i.e., a PHY layer), Layer 2, Layer 3 (e.g., a radio resource control (RRC) layer), and a non-access stratum (NAS) layer. Layer 1, Layer 2 and Layer 3 are referred to as an access stratum (AS).

In the 3GPP LTE system, the layer 2 is split into the following sublayers: Medium Access Control (MAC), Radio Link Control (RLC), and Packet Data Convergence Protocol (PDCP). In the 3GPP New Radio (NR) system, the layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G Core Network QoS flows.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of Signalling Radio Bearers (SRBs) and Data Radio Bearers (DRBs); mobility functions (including: handover and context transfer; UE cell selection and reselection and control of cell selection and reselection; Inter-RAT mobility); QoS management functions; UE measurement reporting and control of the reporting; detection of and recovery from radio link failure; NAS message transfer to/from NAS from/to UE.

In the 3GPP NR system, the main services and functions of the PDCP sublayer for the user plane include: sequence numbering; header compression and decompression: ROHC only; transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

The RLC sublayer supports three transmission modes: Transparent Mode (TM); Unacknowledged Mode (UM); and Acknowledged Mode (AM). The RLC configuration is per logical channel with no dependency on numerologies and/or transmission durations. In the 3GPP NR system, the main services and functions of the RLC sublayer depend on the transmission mode and include: Transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the MAC sublayer include: mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use. Different kinds of data transfer services are offered by MAC. To accommodate different kinds of data transfer services, multiple types of logical channels are defined i.e. each supporting transfer of a particular type of information. Each logical channel type is defined by what type of information is transferred. Logical channels are classified into two groups: Control Channels and Traffic Channels. Control channels are used for the transfer of control plane information only, and traffic channels are used for the transfer of user plane information only. Broadcast Control Channel (BCCH) is a downlink logical channel for broadcasting system control information, paging Control Channel (PCCH) is a downlink logical channel that transfers paging information, system information change notifications and indications of ongoing Public Warning Systems (PWS) broadcasts, Common Control Channel (CCCH) is a logical channel for transmitting control information between UEs and network and used for UEs having no RRC connection with the network, and Dedicated Control Channel (DCCH) is a point-to-point bi-directional logical channel that transmits dedicated control information between a UE and the network and used by UEs having an RRC connection. Dedicated Traffic Channel (DTCH) is a point-to-point logical channel, dedicated to one UE, for the transfer of user information. A DTCH can exist in both uplink and downlink. In Downlink, the following connections between logical channels and transport channels exist: BCCH can be mapped to BCH; BCCH can be mapped to downlink shared channel (DL-SCH); PCCH can be mapped to PCH; CCCH can be mapped to DL-SCH; DCCH can be mapped to DL-SCH; and DTCH can be mapped to DL-SCH. In Uplink, the following connections between logical channels and transport channels exist:

CCCH can be mapped to uplink shared channel (UL-SCH); DCCH can be mapped to UL-SCH; and DTCH can be mapped to UL-SCH.

Figure 3:
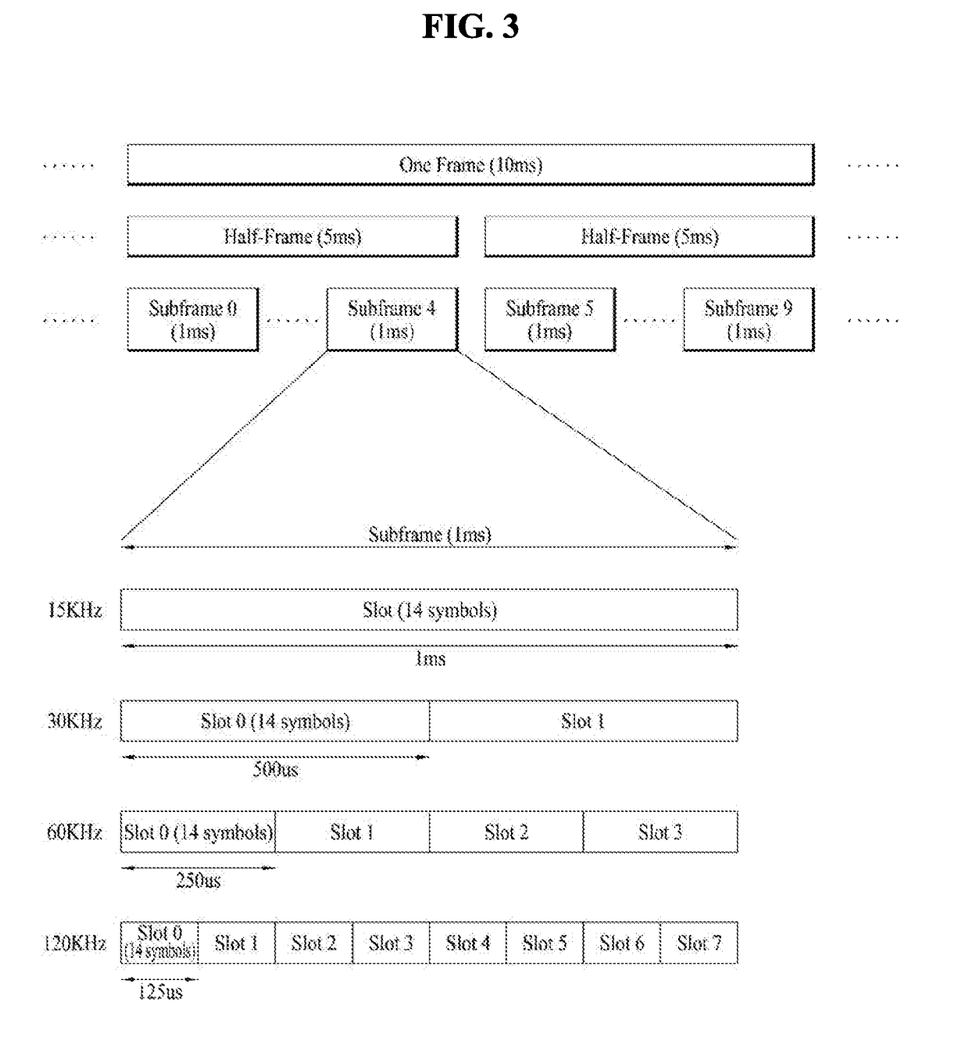
FIG. 3 illustrates an example of a frame structure in a 3GPP based wireless communication system.

FIG. 3 illustrates an example of a frame structure in a 3GPP based wireless communication system.

The frame structure illustrated in FIG. 3 is purely exemplary and the number of subframes, the number of slots, and/or the number of symbols in a frame may be variously changed. In the 3GPP based wireless communication system, an OFDM numerology (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g. a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 3, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2^u * 15$ kHz. The following table shows the number of OFDM symbols per slot, the number of slots per frame, and the number of slots per for the normal CP, according to the subcarrier spacing $\Delta f = 2^u * 15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The following table shows the number of OFDM symbols per slot, the number of slots per frame, and the number of slots per for the extended CP, according to the subcarrier spacing $\Delta f = 2^u * 15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g. subcarrier spacing) and carrier, a resource grid of $N^{size,u}_{grid,x} * N^{RB}_{sc}$ subcarriers and $N^{subframe}_{symb}$ OFDM symbols is defined, starting at common resource block (CRB) $N^{start,u}_{grid}$ indicated by higher-layer signaling (e.g. radio resource control (RRC) signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB} = n_{CRB} + N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

Figure 4:
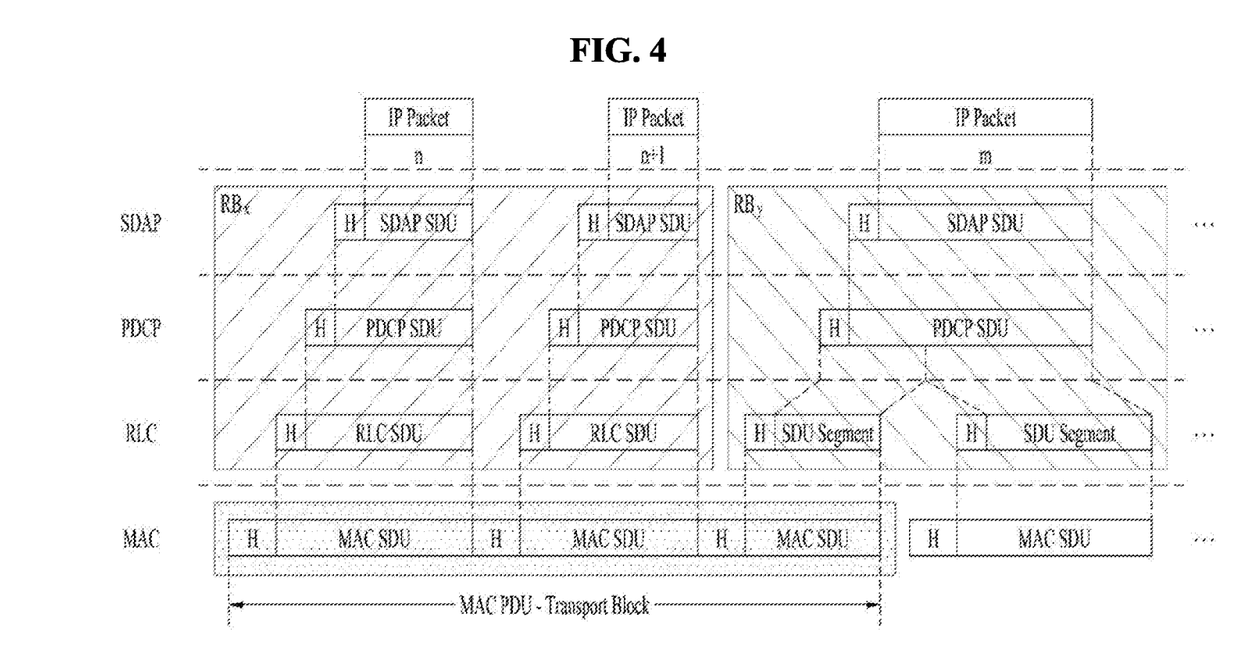
FIG. 4 illustrates a data flow example in the 3GPP new radio (NR) system.

FIG. 4 illustrates a data flow example in the 3GPP NR system.

In FIG. 4, "RB" denotes a radio bearer, and "H" denotes a header. Radio bearers are categorized into two groups: data radio bearers (DRB) for user plane data and signalling radio bearers (SRB) for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on a UL grant, and a MAC PDU related to DL-SCH is transmitted by a BS via a PDSCH based on a DL assignment.

If a UE is powered on or newly enters a cell, the UE performs an initial cell search procedure of acquiring time and frequency synchronization with the cell and detecting a physical cell identity $N^{cell}_{ID}$ of the cell. To this end, the UE may obtain (time and/or frequency) synchronization with a cell of the BS by receiving synchronization signals of the cell, e.g. a primary synchronization signal (PSS) and a secondary synchronization signal (SSS), from the BS and obtain information such as a cell identity (ID). The UE having finished initial cell search may perform the random access procedure to complete access to the BS. To this end, the UE may transmit a preamble through a physical random access channel (PRACH), and receive a response message which is a response to the preamble through a PDCCH and PDSCH. In the case of contention-based random access, transmission of an additional PRACH and a contention resolution procedure for the PDCCH and a PDSCH corresponding to the PDCCH may be performed. After performing the procedure described above, the UE may perform PDCCH/PDSCH reception and PUSCH/PUCCH transmission as a typical procedure of transmission of an uplink/downlink signal.

The random access procedure is used for various purposes including initial access, adjustment of uplink synchronization, resource assignment, and handover. The random access procedure is triggered by various events. The events triggering the random access procedure may comprise: initial access from RRC_IDLE; RRC connection re-establishment; DL or UL data arrival during RRC_CONNECTED when UL synchronization status is "non-synchronized"; UL data arrival during RRC_CONNECTED when there is no PUCCH resources for scheduling request (SR) available; SR failure; request by RRC upon synchronization reconfiguration (e.g. handover); transition from RRC_INACTIVE; to establish time alignment at SCell addition; request for other system information (SI), where the other SI encompasses all system information blocks (SIBs) not broadcast in the minimum SI required for initial access and information for acquiring any other SI; and/or beam failure recovery.

The random access procedure takes two distinct forms: a contention-based random access (CBRA) procedure and a contention-free random access (CFRA) procedure. The CFRA procedure is used for general operations including initial access, while the CFRA procedure is used for limited operations such as handover, random access triggered by PDCCH order, BFR, request for other SI and etc.

In the CBRA procedure, the UE randomly selects a RACH preamble sequence. Accordingly, it is possible that multiple UEs may transmit the same RACH preamble sequence at the same time. Thereby, a contention resolution procedure needs to be subsequently performed. On the other hand, in the CFRA procedure, the UE may use an RACH preamble sequence that the BS uniquely allocates to the UE. Accordingly, the random access procedure may be performed without contention with other UEs.

The CBRA procedure may include the following four steps. Messages/transmissions in Steps 1 to 4 given below may be referred to as Msg1 to Msg4, respectively.

1) Step 1: Random Access Preamble on RACH in uplink (Msg1 from UE to BS);
2) Step 2: Random Access Response on DL-SCH (Msg2 from BS to UE);
3) Step 3: First scheduled UL transmission on UL-SCH (Msg3 from UE to BS); and
4) Step 4: Contention Resolution on DL (Msg4 from BS to UE).

The CFRA procedure may include the following three steps.

1) Step 0: Random Access Preamble assignment (from BS to UE);
2) Step 1: Random Access Preamble on RACH in uplink (Msg1 from UE to BS); and
3) Step 2: Random Access Response on DL-SCH (Msg2 from BS to UE).

In the conventional wireless communication system, one downlink (DL) carrier of a cell is paired with at most one uplink (UL) carrier. In other words, in the conventional wireless communication system, a UE is configured with at most one uplink (UL) for one downlink (DL) of a same cell. Unlike the conventional wireless communication system, in some scenarios of the NR system, supplementary uplink (SUL) can be configured to improve UL coverage. For example, UE may be configured with additional, supplementary UL (SUL) in conjunction with a UL/DL carrier pair (FDD band) or a bidirectional carrier (TDD band). If a UL carrier of a serving cell is supplemented by SUL, then there are two UL for one DL of the serving cell: one is normal uplink (hereinafter, NUL) of the serving cell and the other one is SUL. In other words, the UE is configured with two ULs for one DL of the same cell. The SUL differs from the aggregated uplink in that the UE may be scheduled to transmit either on the SUL or on the uplink of the serving cell being supplemented, but not on both at the same time. For the UE configured with two ULs for one DL of a serving cell, uplink transmissions on those two ULs may be controlled by the network to avoid overlapping PUSCH/PUCCH transmissions in time. Overlapping transmissions on PUSCH may be avoided through scheduling while overlapping transmissions on PUCCH are avoided through configuration (PUCCH can only be configured for only one of the 2 ULs of the cell).

According to the recent 5G specification (e.g. 3GPP TS 38.321 V15.2.0), for random access in a cell configured with SUL, the network can explicitly signal which UL carrier to use (NUL or SUL). Otherwise, the UE selects one carrier between NUL and SUL of the serving cell based on the reference signal received power (RSRP) of a downlink pathloss reference of the serving cell. In detail, referring to 3GPP TS 38.321 V15.2.0, when the random access procedure is initiated on a Serving Cell, the MAC entity of the UE shall:

1> if the Serving Cell for the Random Access procedure is configured with supplementary Uplink; and
1> if the RSRP of the downlink pathloss reference is less than rsrp-ThresholdSSB-SUL:
2>> select the SUL carrier for performing Random Access procedure;
2>> set the PCMAX to $P_{CMAX,f,c}$ of the SUL carrier.
1> else:
2>> select the NUL carrier for performing Random Access procedure;
2>> set the PCMAX to $P_{CMAX,f,c}$ of the NUL carrier.

Here, PCMAX is a UE variable used for the random access procedure. $P_{CMAX,f,c}$ is the UE configured maximum output power for carrier f of serving cell c within transmission occasion i. The network may configure a serving cell of a UE with SUL through RRC signalling containing the parameter supplementary Uplink. The network may provide a UE with the parameter rsrp-ThresholdSSB-SUL, where is a threshold to be used by the UE when the UE selects a UL carrier among UL carriers of a serving cell to perform a random access on the serving cell.

Once the UE selects one carrier among NUL and SUL of a serving cell for a random access (RA) procedure on the serving cell, all uplink transmissions of the RA procedure remain on the selected carrier. However, the selected carrier may suffer from high load situation if multiple UEs are performing an RA procedure on that carrier. Although the selection of the carrier is independently done by UEs, high loaded carrier problem could happen because the selection of the carrier is based on the RSRP of downlink pathloss reference and the UEs located in the similar area may experience similar RSRP of downlink pathloss reference of the serving cell. In addition, a preferred carrier for random access preamble (RAP) transmission could change because the RSRP of downlink pathloss reference may change during an RA procedure.

To solve the above-mentioned problem, a new method of performing an RA procedure on a cell configured with SUL may be implemented, which the UE may reselect a carrier before a new RAP transmission on the cell. In this method, as the downlink pathloss reference might not change so frequently, the change of UL carrier for the new RAP transmission may be allowed with some restriction by using a timer or a counter. However, this method may not be proper in that it is hardly predictable when the RSRP changes or how frequently the high load situation would occur. Therefore, this method may lead to unnecessary or insufficient carrier reselection. In addition, when the carrier is suffer from high load, RSRP based carrier reselection may still result in selecting the same carrier because the RSRP is linear average of downlink reference signal for a given bandwidth of the serving cell and it may not reflect the high loaded situation in uplink.

To solve the problems of carrier selection method according to the recent standards specification and to cope with the problems of the above method new method, it is required for a UE to use a proper condition when the UE performs the carrier reselection for RAP transmission, and the carrier reselection mechanism needs to provide sufficient randomness when such condition is met. Accordingly, the following method may be implemented.

Figure 5:
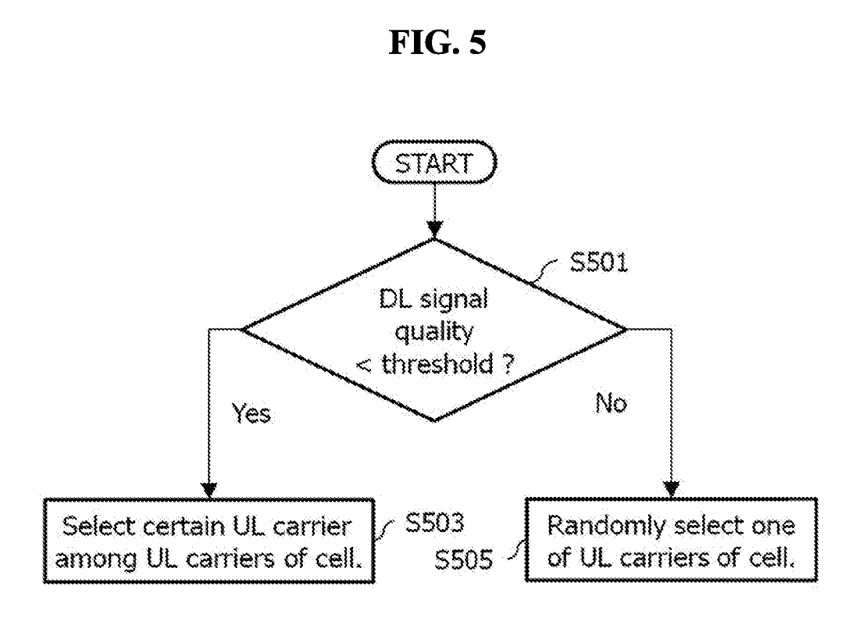
FIG. 5 illustrates an example of a flow diagram according to implementations of the present disclosure.

FIG. 5 illustrates an example of a flow diagram according to implementations of the present disclosure.

A UE may be configured with at least two UL carriers for a serving cell. The at least two UL carriers can comprise a normal uplink (NUL) carrier and a supplementary uplink (SUL) carrier. In the present disclosure, when a serving cell is configured with at least two UL carriers, in order to select a UL carrier via which the UE is to transmit an RAP, the UE compares a DL signal quality of the serving cell to a threshold. The UE randomly selects one of the UL carriers if the current DL signal quality is equal to or above the threshold whereas the UE selects a certain DL carrier if the current DL signal quality is lower than the threshold. Furthermore, the UE performs reselection of the UL carrier only if a condition is met, where the condition is defined based on the previous DL signal quality. Among the UL carriers of the serving cell, the certain UL carrier can be pre-defined, either by the network or in the wireless communication technical standards specification, on which the UE transmits an RAP if the DL signal quality is lower than the threshold. For example, the SUL can be the certain UL carrier. In the present disclosure, the SUL can be operating on a lower frequency than that of the NUL.

In the present disclosure, the DL signal quality is measured for the same downlink pathloss reference for a serving cell. For example, the DL signal quality can be the RSRP (Reference Signal Received Power).

In the present disclosure, the UE is configured with a threshold (TH) which is used for comparison of DL signal quality of the serving cell, wherein the DL signal quality is measured, for example, based on a downlink pathloss reference of the serving cell.

The UE may initiate an RA procedure. Referring to FIG. 5, for the RA procedure, in order to transmit a random access preamble (RAP) to the network, the UE selects or reselects a UL carrier as follows.

The UE compares the DL signal quality to the threshold (TH) (S501). If the current DL signal quality is less than the TH, i.e., the DL signal quality is not good (S501, Yes), the UE selects the certain DL carrier (S503).

If the DL signal quality is equal to or above the TH, i.e., the current DL signal quality is good (S501, No), the UE randomly selects one of the UL carriers (S505). As UEs performing RA procedure on a serving cell randomly select one of UL carriers of the serving cell when the DL signal quality of the serving cell is good, congestions due to RA procedures by multiple UEs can be distributed.

In the present disclosure, the UE may perform selection of a UL carrier where the UE transmits an RAP when the RA procedure is initiated. In the present disclosure, the UE may performs reselection of a UL carrier where the UE transmits an RAP when:

Random Access Response (RAR) reception fails;
Contention Resolution fails;
RAR reception/Contention Resolution fails and the previous DL signal quality is in range of 'TH minus X' and 'TH plus Y', where X and Y are positive values; or
RAR reception/Contention Resolution fails and the current DL signal quality is changed more than X compared to the previous DL signal quality, where X and/or Y are either configurable (e.g., in units of dBm, or in units of dB) by the network or pre-defined in the wireless communication standards specification. The threshold (TH) may be configured by the network, or pre-defined in the wireless communication standards specification. The DL signal quality may be considered changed if the current DL signal quality is X (dB/dBm) higher or lower than the previous DL signal quality.

In the present disclosure, the previous DL signal quality may mean a DL signal quality at the time point when the UE determines whether to (re)select the UL carrier for the previous RAP transmission. Even if the UE does not perform the UL carrier (re)selection as a result of determination at a time point, the DL signal quality at this time point can be used as previous downlink signal quality for later determination of whether to (re)select the UL carrier. In other words, even if the UE did not perform the UL carrier (re)selection at Time Point 1 for an RAP transmission, the UE uses the DL signal quality at Time Point 1 when the UE determines whether to (re)select the UL carrier if the RAP transmission fails.

If the UE does not perform reselection of a UL carrier, the UE transmits an RAP on the same carrier where the UE previously transmits an RAP but fails.

After selecting the UL carrier, the UE transmits the RAP to the network on the selected UL carrier and start to monitor a PDCCH to receive a RAR in response to the transmitted RAP. If the RAR reception fails according to the condition described in the wireless communication standards specification (e.g. 3GPP TS 38.321), the UE performs reselection of a UL carrier as described above.

If the RAR reception succeeds according to the condition described in the wireless communication standards specification (e.g. 3GPP TS 38.321), the UE may perform a Contention Resolution step according to the wireless communication standards specification. If the Contention Resolution fails, the UE performs reselection of a UL carrier as described above.

Figure 6:
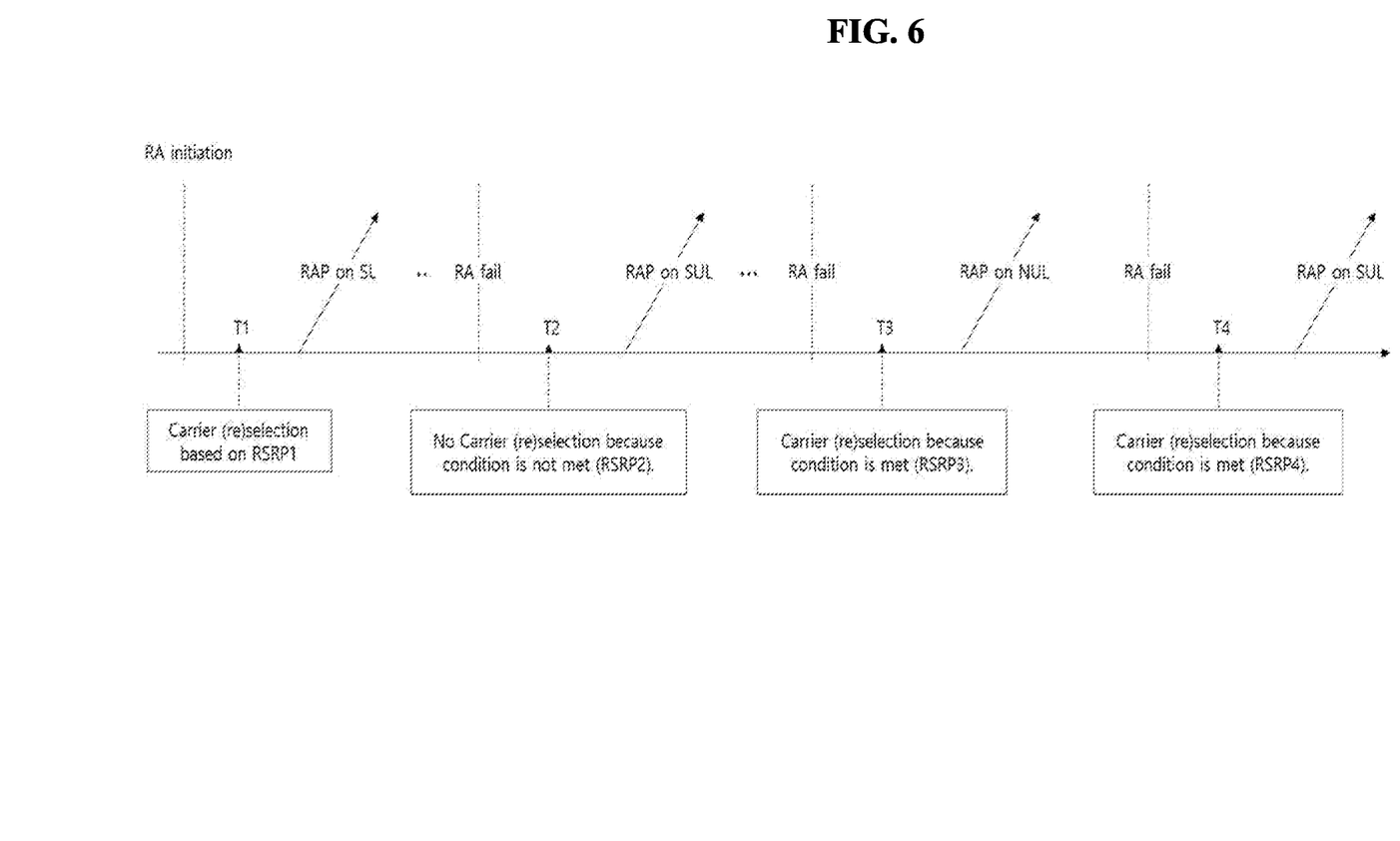
FIG. 6 shows an example of an RA procedure according to an implementation of the present disclosure.

FIG. 6 shows an example of an RA procedure according to an implementation of the present disclosure.

In the example of FIG. 6, the UE performs reselection of a UL carrier via which the UE transmits an RAP when RAR reception/Contention Resolution fails and the previous DL signal quality is in range of 'TH minus X' and 'TH plus Y'.

In the example of FIG. 6, the UE is configured with two UL carriers for a serving cell, which are one NUL and one SUL. The UE is further configured with a RSRP threshold, i.e., TH, and a range for RSRP comparison, e.g., [TH−C, TH+C]. The UE is configured to transmit an RAP on a SUL if the RSRP<TH.

In the example of FIG. 6, the UE initiates an RA procedure. At T1, the UE compares the RSRP1 of the serving cell and RSRP1 is below TH. Thus, the UE selects the SUL in order to transmit an RAP. The UE transmits an RAP to the network on the SUL.

If the RA procedure fails (e.g., RAR reception fails or CR fails), the UE may decide to retransmit an RAP for the RA procedure. At T2, the UE checks whether RSRP1 is in range of [TH−C, TH+C]. In the example of FIG. 6, RSRP1 is out of [TH−C, TH+C], e.g., RSRP1<TH−C or RSRP1> TH+C. As RSRP1 is out of [TH−C, TH+C], the UE does not perform the reselection of the UL carrier and keeps using the previous UL carrier, i.e., SUL, to transmit an RAP. Accordingly, the UE transmits an RAP on the SUL.

If the RA procedure fails again (e.g., RAR reception fails or CR fails), the UE may decide to retransmit an RAP for the RA procedure. At T3, the UE checks whether RSRP2 is in range of [TH−C, TH+C]. In the example of FIG. 6, RSRP2 is within [TH−C, TH+C], e.g., TH−C<RSRP2<TH+C. As RSRP2 is within [TH−C, TH+C], the UE performs the reselection of the UL carrier. At T3, as RSRP3> TH, the UE randomly selects one carrier among NUL and SUL. In the example of FIG. 6, the UE selects NUL. The UE transmits an RAP to the network on the NUL.

If the RA procedure fails (e.g., RAR reception fails or CR fails), the UE may decide to retransmit an RAP for the random access procedure. At T4, the UE checks whether RSRP3 is in range of [TH−C, TH+C]. In the example of FIG. 6, RSRP3 is within [TH−C, TH+C], e.g., TH−C<RSRP3<TH+C. As RSRP3 is within [TH−C, TH+C], the UE performs the reselection of the UL carrier. At T4, as RSRP4<TH, the UE selects SUL and transmits an RAP to the network on the SUL.

Figure 7:
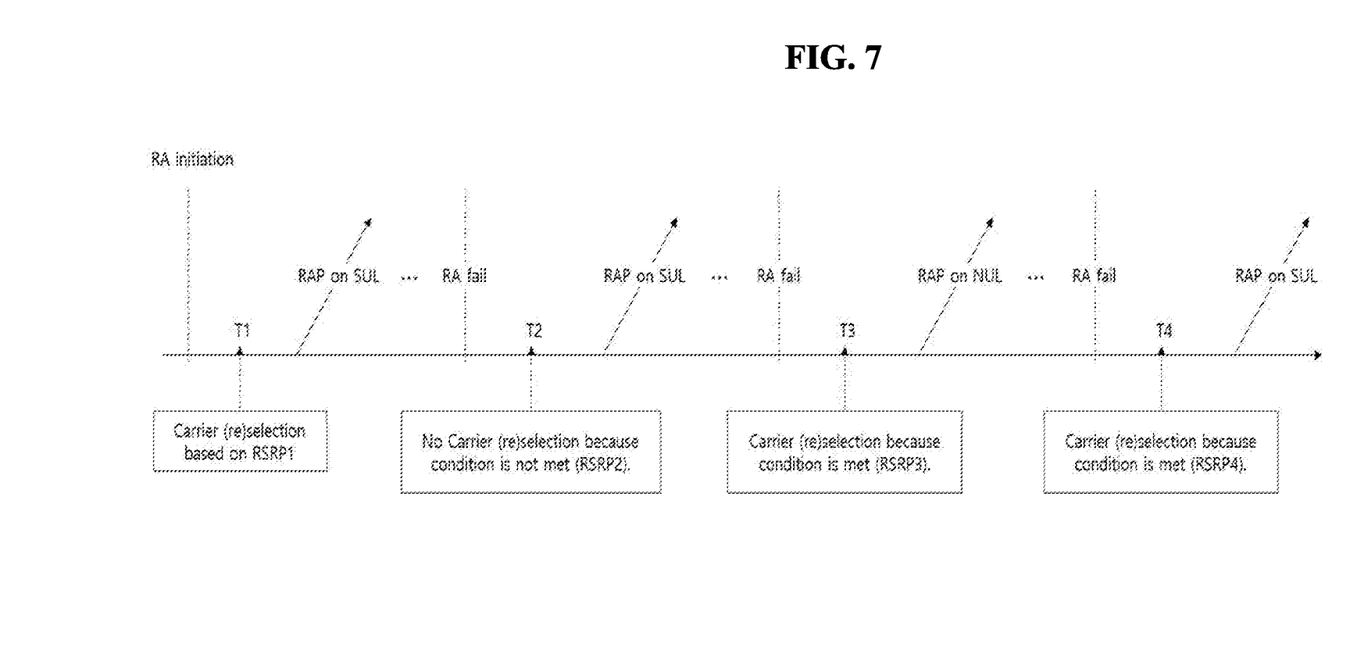
FIG. 7 shows another example of an RA procedure according to an implementation of the present disclosure.

FIG. 7 shows another example of an RA procedure according to an implementation of the present disclosure.

In the example of FIG. 7, the UE performs reselection of a UL carrier where the UE transmits an RAP when RAR reception/Contention Resolution fails and the current DL signal quality is changed more that X compared to the previous DL signal quality.

In the example of FIG. 7, the UE is configured with two UL carriers for a serving cell, which are one NUL and one SUL. The UE is further configured with a RSRP threshold, i.e., TH, and an offset X in dBm for RSRP comparison. The UE is configured to transmit an RAP on a SUL if the RSRP<TH.

In the example of FIG. 7, the UE initiates an RA procedure. At T1, the UE compares the RSRP1 of the serving cell and RSRP1 is below TH. Thus, the UE selects the SUL in order to transmit an RAP. The UE transmits an RAP to the network on the SUL.

If the RA procedure fails (e.g., RAR reception fails or CR fails), the UE may decide to retransmit an RAP for the RA procedure. At T2, the UE checks whether RSRP2 is changed more than X dBm compared to RSRP1. As it is False in the example of FIG. 7, the UE does not perform the reselection of the UL carrier and keeps using the previous UL carrier, i.e., SUL, to transmit an RAP. Therefore, the UE transmits an RAP on the SUL.

If the RA procedure fails (e.g., RAR reception fails or CR fails), the UE may decide to retransmit an RAP for the RA procedure. At T3, the UE checks whether RSRP3 is changed more than X dBm compared to RSRP2. As it is True in the example of FIG. 7, the UE performs the reselection of the UL carrier. At T3, as RSRP3> TH, the UE randomly selects one carrier among NUL and SUL. In the example of FIG. 7, the UE selects NUL. The UE transmits an RAP to the network on the NUL.

If the RA procedure fails (e.g., RAR reception fails or CR fails), the UE may decide to retransmit an RAP for the RA procedure. Step12. At T4, the UE checks whether RSRP4 is changed more than X dBm compared to RSRP3. As it is True in the example of FIG. 7, the UE performs the reselection of the UL carrier. At T4, as RSRP4<TH, the UE selects SUL, and transmits an RAP to the network on SUL.

As described above, the detailed description of the preferred implementations of the present disclosure has been given to enable those skilled in the art to implement and practice the invention. Although the invention has been described with reference to exemplary examples, those skilled in the art will appreciate that various modifications and variations can be made in the present disclosure without departing from the spirit or scope of the invention described in the appended claims. Accordingly, the invention should not be limited to the specific examples described herein, but should be accorded the broadest scope consistent with the principles and novel features disclosed herein.

The implementations of the present disclosure are applicable to a BS, a UE, or other devices in a wireless communication system.

What is claimed are:

1. A method for performing a random access (RA) procedure by a user equipment (UE) in a wireless communication system, the method comprising:
   selecting an uplink carrier for the RA procedure between a first uplink carrier for a serving cell and a second uplink carrier for the serving cell,
   wherein selecting the uplink carrier comprises:
      selecting the first uplink carrier when a downlink signal quality of the serving cell is less than a first threshold, and
      selecting one of the first and second uplink carriers randomly when the downlink signal quality of the serving cell is equal to or above the first threshold;
   performing a first random access preamble (RAP) transmission for the RA procedure through the selected uplink carrier; and
   reselecting an uplink carrier for the RA procedure when a random access response (RAR) reception for the first RAP transmission or contention resolution for the first RAP transmission fails and when the downlink signal quality of the serving cell changes more than X; and
   performing a second RAP transmission through the reselected uplink carrier.

2. The method according to claim 1, where X is configured by a network.

3. The method according to claim 1, wherein the first uplink carrier is operating at a lower frequency than that of the second uplink carrier.

4. The method according to claim 1, further comprising:
   receiving configuration information regarding the first threshold.

5. A user equipment (UE) for performing a random access (RA) procedure in a wireless communication system, the UE comprising:
   a transceiver;
   at least one processor; and
   at least one computer memory operably connected to the at least one processor and storing instructions that, when executed, cause the at least one processor to perform operations comprising:

selecting an uplink carrier for the RA procedure between a first uplink carrier for a serving cell and a second uplink carrier for the serving cell, wherein selecting the uplink carrier comprises:
    selecting the first uplink carrier when a downlink signal quality of the serving cell is less than a first threshold, and
    selecting one of the first and second uplink carriers randomly when the downlink signal quality of the serving cell is equal to or above the first threshold;

performing a first random access preamble (RAP) transmission for the RA procedure through the selected uplink carrier;

reselecting an uplink carrier for the RA procedure when a random access response (RAR) reception for the first RAP transmission or contention resolution for the first RAP transmission fails and when the downlink signal quality of the serving cell changes more than X; and performing a second RAP transmission through the reselected uplink carrier.

6. The UE according to claim 5, where X is configured by a network.

7. The UE according to claim 5, wherein the first uplink carrier is operating at a lower frequency than that of the second uplink carrier.

8. The UE according to claim 5, wherein the operations further comprise:
    receiving configuration information regarding the first threshold.

9. The UE according to claim 6, wherein the UE is an autonomous vehicle that communicates with at least a mobile terminal, a network, or another autonomous vehicle other than the UE.

10. The method according to claim 1, wherein X reflects a change in the signal quality of the serving cell relative to a previous signal quality of the serving cell.

11. The UE according to claim 5, wherein X reflects a change in the signal quality of the serving cell relative to a previous signal quality of the serving cell.

\* \* \* \* \*